May 27, 1969 — M. L. SLIMOVITZ — 3,445,861
POT HOLDER WITH VACUUM CUP HANDLE
Filed April 29, 1966
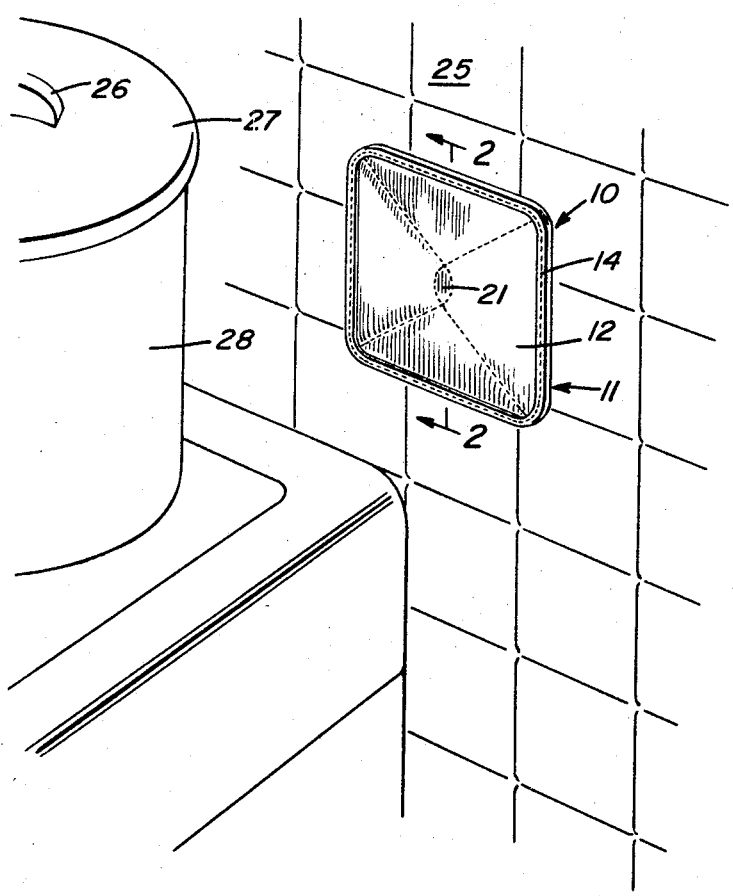
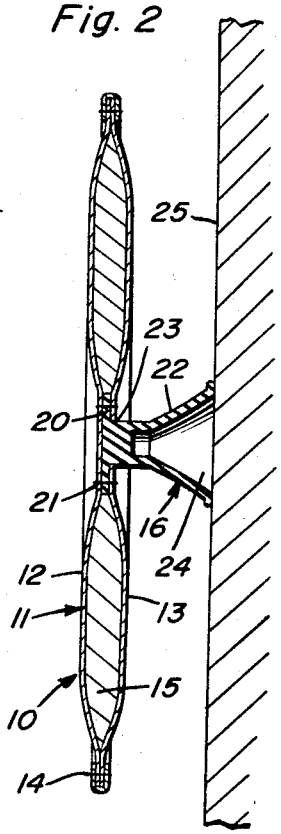
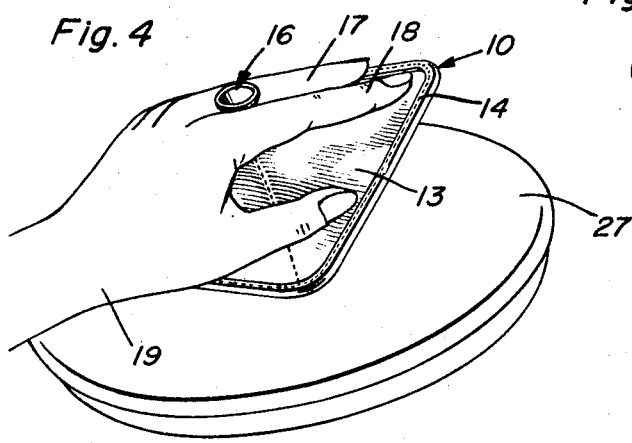
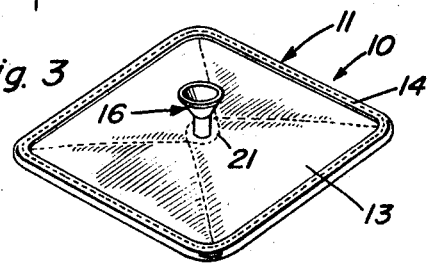
Morris L. Slimovitz
INVENTOR.
BY *Clarence A. O'Brien*
*and Harvey B. Jacobson*
Attorneys

United States Patent Office 3,445,861
Patented May 27, 1969

3,445,861
POT HOLDER WITH VACUUM CUP HANDLE
Morris L. Slimovitz, c/o Morris Manufacturing Co.,
P.O. Box 219, Newbern, Tenn. 38059
Filed Apr. 29, 1966, Ser. No. 546,337
Int. Cl. F16b 47/00
U.S. Cl. 2—20                                   3 Claims

ABSTRACT OF THE DISCLOSURE

A flat pot holder body including two outward layers and filler material contained therebetween. A suction cup handle including a flanged inner portion is disposed and secured between the layers, an outer diverging portion projecting outwardly through an opening in one of the layers.

---

This invention relates to new and useful improvements in pot holders, and the principal object of the invention is to provide an improved pot holder which may be conveniently held and manipulated by the use of one hand only.

Conventional pot holders, in the form of a simple pad, possess the disadvantage in that they usually require both hands to be used, one for picking up the holder and dropping it on the lid of a pot, and the other for grasping the knob of the pot lid with the holder applied thereto. Also, conventional pot holders are difficult to hold and use when the palm of the hand is facing downwardly and, even at best, they very often have the tendency to slip out of the user's hand.

An important feature of the present invention resides in providing the pot holder with a convenient handle which projects outwardly from the pot holder and is adapted to fit between two adjacent fingers of the user's hand, so that the pot holder may be easily held and manipulated without any danger of becoming displaced.

Another important feature of the invention resides in forming the handle of the pot holder from resiliently usable material, so that it may be compressed and firmly held between the fingers by a positive frictional grip.

Another important feature of the invention resides in making the handle hollow so that it is capable of functioning as a suction cup for attachment of the pot holder to a suitable supporting surface when the pot holder is not being used.

Other advantages of the invention reside in its simple construction, in its efficient and dependable use, and in its adaptability to convenient and economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view showing the improved pot holder of the invention held by suction on a wall adjacent to a pot on a kitchen stove;

FIGURE 2 is an enlarged, vertical sectional view, taken substantially on the plane of the line 2–2 of FIGURE 1;

FIGURE 3 is a respective view of the improved pot holder per se; and

FIGURE 4 is a perspective view showing the pot holder in use in lifting a pot lid.

Referring now to the accompanying drawings in detail, the improved pot holder of the invention is designated generally by the reference character 10. The same comprises a substantially flat pot holder body 11 made from fabric or any other suitable material.

The pot holder body 11 is in the form of a casing including a pair of superposed walls or layers of fabric material 12, 13, such material layers being suitably secured together along their marginal edges, as for example, by the stitching 14. A filler of suitable packing material 15 is provided between the casing walls 12, 13 as will be clearly apparent from FIGURE 2, the packing or padding material 15 preferably being such as to possess good heat insulating properties.

For purposes of orientation, the wall 12 of the pot holder body 11 may be referred to as the work engaging side of the pot holder, while the wall 13 may be referred to as the hand engaging side.

The essence of novelty of the invention resides in providing the pot holder body 11 with a handle designated generally by the numeral 16. The handle 16 is located on and projects outwardly from the hand engaging side 13 of the pot holder body, and is adapted to be gripped between two adjacent fingers 17, 18 of a user's hand 19 as shown in FIGURE 4, so that the pot holder may be conveniently held and manipulated.

The handle 16 is preferably formed from resiliently yieldable material such as rubber, flexible plastic, or the like, and, as will be apparent from FIGURE 2, the handle includes a flanged inner portion 20 which is interposed between the walls 12, 13 substantially at the center of the pot holder body 11 and is securely fastened therein, as for example by the stitching 21 passing through both the walls 12, 13 and the inner portion 20 of the handle. If desired, the stiching 21 may be extended outwardly to the stitching 14 along the marginal edges of the pot holder body, as will be clearly understood.

The outer portion 22 of the handle 16 is preferably formed integrally with the flanged inner portion 20 and projects outwardly through a suitable opening 23 formed in the body side wall 13. The outer handle portion 22 is outwardly enlarged, for example, by having a substantially frusto-conical configuration as shown in the drawings, so as to resist any tendency of the handle slipping through between the fingers when the pot holder is in use.

Also, the outer portion 22 of the handle is preferably hollow as indicated at 24, whereby the same is substantially compressible and may be squeezed between the fingers 17, 18 for a firm, positive grip.

The outer end of the cavity 24 in the outer portion 22 of the handle is open and, since the handle is formed from resiliently flexible material, the handle portion 22 in effect constitutes a suction cup, whereby the pot holder may be conveniently attached to a suitable supporting surface, as for example, a wall 25, when the pot holder is not in use.

When the pot holder of the invention is to be used, the handle 16 is simply engaged between two adjacent fingers of the hand as illustrated in FIGURE 4. The outwardly enlarged configuration of the handle together with its ability to be squeezed between the fingers, effectively safeguards against any possibility of the pot holder being displaced. With the pot holder thus applied to the hand, it may then be conveniently applied to the work, as for example, to the usual knob 26 on the lid 27 of a pan 28, it being noted that the pot holder may be picked up, applied to the pot lid and manipulated by the use of one hand only. It will be also observed that the handle 16 will firmly retain the pot holder in the hand even when the hand is inverted with the palm facing downwardly, as illustrated in FIGURE 4.

As already stated, when the pot holder is not in use, it may be readily applied to and supported on a wall 25 by virtue of the hollow handle portion 22 serving as a suction cup.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A pot holder comprising in combination, a substantially flat pot holder body having a work engaging side and a hand engaging side, said body consisting of a casing of flexible material including a work engaging casing wall and a hand engaging casing wall secured together along their marginal edges, a filler of padding material provided in said casing between said work engaging and said hand engaging walls thereof, and a handle provided on and divergingly projecting outwardly from the hand engaging side of said body, said handle including a flanged inner portion disposed and secured between said walls of said casing and an outer portion projecting outwardly through an opening in the hand engagng wall of said casing to fit between two adjacent fingers of a user's hand, whereby the pot holder may be easily held and manipulated by the use of one hand only.

2. The device as defined in claim 1 wherein the handle is formed from resiliently yieldable material, whereby to permit compression thereof between and resist slipping thereof through the user's fingers.

3. The device as defined in claim 2 wherein said outer portion of said handle is hollow and defines a suction cup for attachment of the pot holder to a supporting surface.

References Cited

UNITED STATES PATENTS

| | | | |
|---|---|---|---|
| 1,566,933 | 12/1925 | Toepfer | 16—116.2 |
| 1,984,610 | 12/1934 | Warren | 248—206 |
| 2,590,395 | 3/1952 | Fry | 16—118 |
| 2,645,776 | 7/1953 | Kiler | 2—20 |
| 2,727,238 | 12/1955 | Silver | 2—20 |
| 3,125,824 | 3/1964 | Staver | 15—509 |

FOREIGN PATENTS

| | | |
|---|---|---|
| 1,238,653 | 7/1960 | France. |

JAMES R. BOLER, *Primary Examiner.*

U.S. Cl. X.R.

248—206; 16—116